(12) United States Patent
Sanderson

(10) Patent No.: US 8,136,413 B2
(45) Date of Patent: Mar. 20, 2012

(54) BI-DIRECTIONAL OSCILLATING JET FLOWMETER

(75) Inventor: Michael Langley Sanderson, Milton Keynes (GB)

(73) Assignee: Elster Metering Limited, Luton (GB)

( * ) Notice: Subject to any disclaimer, the term of this patent is extended or adjusted under 35 U.S.C. 154(b) by 0 days.

(21) Appl. No.: 12/530,961

(22) PCT Filed: Mar. 7, 2008

(86) PCT No.: PCT/GB2008/000797
§ 371 (c)(1),
(2), (4) Date: Dec. 23, 2009

(87) PCT Pub. No.: WO2008/110766
PCT Pub. Date: Sep. 18, 2008

(65) Prior Publication Data
US 2010/0139414 A1    Jun. 10, 2010

(30) Foreign Application Priority Data
Mar. 13, 2007 (GB) .................................. 0704755.8

(51) Int. Cl.
*G01F 1/20* (2006.01)
(52) U.S. Cl. .................................................. 73/861.19
(58) Field of Classification Search ............... 73/861.19, 73/861.21, 861.23
See application file for complete search history.

(56) References Cited

U.S. PATENT DOCUMENTS

| | | | | | |
|---|---|---|---|---|---|
| 4,930,357 | A | * | 6/1990 | Thurston et al. | 73/861.19 |
| 5,309,770 | A | * | 5/1994 | Okabayashi | 73/861.19 |
| 5,959,216 | A | * | 9/1999 | Hocquet et al. | 73/861.19 |
| 6,477,900 | B2 | * | 11/2002 | Krasilchikov et al. | 73/861.19 |
| 7,383,740 | B2 | * | 6/2008 | Krasilchikov et al. | 73/861.19 |

FOREIGN PATENT DOCUMENTS

| | | |
|---|---|---|
| DE | 10119860 A1 | 10/2002 |
| EP | 1118841 A2 | 7/2001 |
| GB | 1453587 A | 10/1976 |
| JP | 62175619 A | 8/1987 |
| WO | 2005046426 A2 | 5/2005 |

OTHER PUBLICATIONS

Search Report for British Application No. GB0704755.8 dated Jun. 29, 2007.
International Search Report for International Application No. PCT/GB2008/000797 dated Jul. 22, 2008.

* cited by examiner

*Primary Examiner* — Jewel V Thompson
(74) *Attorney, Agent, or Firm* — Harness, Dickey & Pierce, P.L.C.

(57) ABSTRACT

A bi-directional flowmeter comprises a first fluidic oscillator device arranged to measure the flow of fluid in a first direction and a second fluidic oscillator device arranged to measure the flow of fluid in a second direction opposite to the first direction and in which the two oscillators devices are connected together in series between an inlet port and an outlet port of the flowmeter between which the fluid to be measured can flow.

12 Claims, 1 Drawing Sheet

BI-DIRECTIONAL OSCILLATING JET FLOWMETER

This invention relates to improvements in flow measurement devices, and in particular to a bidirectional flowmeter for use in flow measurement.

BACKGROUND TO THE INVENTION

Flowmeters are well known. One particular type of flowmeter is the fluidic oscillator flowmeter which is especially suited to the measurement of the flowrate of gases and liquids, particularly for domestic gas and water purposes. Such devices have been widely reported. Examples of such fluidic oscillator flowmeters can be found in both the academic and patent literature, for example those by Bauer in U.S. Pat. No. 4,244,230 or Herzl in U.S. Pat. No. 4,550,614. Such devices as shown schematically in FIG. 1 typically consist of a reducer section (1) which creates a jet of fluid (2) feeding into a diffuser section (3) which has first and second diffuser walls (4),(5) and first and second feedback channels (6),(7) respectively associated with the first and second walls which enable some of the jet flow to be fed back to the exit of the reducer section.

The mechanism for the flow measurement in a fluidic oscillator of this type has been described by several authors and is well understood. By means of the Coanda effect the jet naturally attaches to one wall or the other. Flow from the jet is then supplied to the feedback channel associated with the diffuser wall to which the flow is attached and the feedback flow feeds a separation bubble between the jet and the diffuser wall and forces the jet away from the wall towards the other diffuser wall. A splitter (8) or target may be used to speed the transition between the two walls. The jet then attaches to the other wall and the process repeats. The jet thus oscillates from one side of the fluidic oscillator to the other. The flow is measured by measuring the frequency of oscillation of the jet. This can be undertaken by the measurement of periodic variations in pressure or velocity at various points within the diffuser section, feedback channels or exit of the fluidic oscillator. For conducting fluids for example it is possible to employ inductive sensing techniques for the measurement of the velocity variations as identified by Sanderson and Heritage in European Patent 0381344. The various methods of measurement of these fluctuations are known to those versed in the art.

Typically such fluidic oscillators when used for domestic gas and water flow measurement have oscillation frequencies in the range 0.25 Hz to 100 Hz. Associated with the sensing technique there are electronic signal processing circuits which amplify and condition the signal to create a digital signal whose frequency corresponds to the frequency of oscillation of the fluidic oscillator. This digital signal is then fed into digital signal processing circuitry whose function is to convert the frequency into a flowrate or totalised flow. The methods of signal processing and of digital processing are known to those versed in the art.

The linearity of the frequency of oscillation to the flowrate of such devices and the low flowrate performance is dependent on the geometry of the fluidic oscillator and both these can be improved by using a conditioning element at the entrance of the fluidic oscillator. An example of such conditioning is given by Sanderson and Furmidge in European Patent 0868652.

Currently fluidic oscillator flowmeters only measure flow over the whole range accurately in one direction. In situations where there is the possibility of reverse flows occurring these would not be measured accurately and it is preferable that these flows should be prevented from flowing through the meter. In domestic water metering applications this is achieved by the installation of non-return valve downstream of the meter so that no flow can occur in the reverse direction.

DESCRIPTION OF THE INVENTION

According to a first aspect the invention provides a bi-directional flowmeter comprising a first fluidic oscillator device arranged to measure the flow of fluid in a first direction and a second fluidic oscillator device arranged to measure the flow of fluid in a second direction opposite to the first direction and in which the two oscillators devices are connected together in series between an inlet port and an outlet port of the flowmeter between which the fluid to be measured can flow.

The two oscillator devices may be provided within a single body. Alternatively, they may be provided in separate bodies which are connected in series with each other.

The first and second oscillator devices may be bi-directional and defined by a single body which consists of a plurality of flow passages that are symmetrically reflected about an axis whereby the performance of the bidirectional fluidic oscillator is the same in both the forward and reverse directions. The axis may comprise a central axis which lies in a plane that separates the two oscillator devices.

Of course, in at least one arrangement they not be identical in design or performance. The invention may therefore provide an asymmetric bi-directional flow meter in which the body consists of an asymmetrical structure in which fluidic oscillator devices in forward and reverse directions are capable of being used for metering but with a different overall metering performance for forward and reverse flows.

The first and second oscillator devices may be connected back to back by which we mean that the inlet side for one is connected to the inlet side to the other or such that the outlet side of one is connected to the outlet side of the other. By inlet side we mean the side of the oscillator from which fluid must enter for the oscillator to measure flow before exiting at the outlet side, e.g. the side closest the reducer. Any flow in the reverse direction, e.g. entering at the outlet side, will not be measured or give a false or unreliable measurement.

In the former case, it is the second oscillator encountered by a flow of fluid on passing through the oscillators that gives a measurement of flow rate, in the later it will be first oscillator encountered by a flow of fluid that gives the reading.

In the former case, the first oscillator encountered by the flow of fluid may act as a flow conditioner to the fluid flow prior to its entering the second oscillator and having its flow rate measured. This clearly works for flow in both directions.

Each oscillator device may include a measurement means adapted to provide an output signal indicative of the frequency of oscillation of the fluid oscillations in the oscillator when operating in its "normal" direction, i.e. fluid flowing from its inlet to its outlet. These signals may be passed to a suitable processing device which determines the flow rate and direction of flow from the two signals. In its simplest form this could be achieved by use of a look up table which contains a flow rate and direction indexed by the two signals provided that for any given flowrate/direction a unique pair of output signal values is present. The processor may comprise a digital signal processor.

The measurement means may comprise an inductive sensor, an ultrasonic or pressure sensor. It may provide an alternating output signal whose frequency matches the frequency of oscillation.

In order for the direction of flow to be determined, each oscillator device should provide an output signal which has an amplitude and/or phase and/or frequency and/or stability of frequency of oscillation that falls within a different range when operating in its normal direction (flow from inlet to outlet) than in the reverse direction.

For example, the device may produce an output having a frequency representing the flow rate which lies within a first range of frequencies for the normal operation and which lies within a second range of frequencies for the reverse operation, the two ranges not overlapping. This allows the signals from both devices to be compared and the flow direction to be unambiguously determined.

It is not essential to all embodiments that the ranges do not overlap. All that is required is that the device produces a given output for any flow rate within a normal range of operation and a different output for that flow rate in the opposite direction such that when the outputs of both devices are analysed by means of their frequencies, amplitudes or stabilities of oscillation it is possible to unambiguously determine the flow rate and the direction of flow of the fluid.

In another alternative, for example, the devices may be arranged such that there is no oscillation for a device operating in the reverse mode.

The two devices may be configured such that any reflection of fluid along the joining axis is such that the pressure drop across the whole device is no greater than that across a single fluidic oscillator. This can be achieved by providing a fluidic oscillator in which a single jet is present i.e. a design which is reflected around the entrance to a conventional oscillator rather than being reflected about the exit of the oscillator. Therefore the jets of the upstream and downstream fluidic oscillators may connected such that the pressure drop across the whole device is no greater than that across a single fluidic oscillator.

Each fluidic oscillator device may comprise a reducer section which creates a jet of fluid feeding into a diffuser section which has first and second diffuser walls and first and second feedback channels respectively associated with the first and second walls which enable some of the jet flow to be fed back to the exit of the reducer section The skilled person will therefore understand that invention in at least one arrangement provides a bidirectional fluidic oscillator which will measure accurately both forward and reverse flows. This design of flowmeter will work with a wide range of different fluidic oscillator geometries and therefore the geometries identified within this patent should be seen as exemplars only and the patent is not restricted to the particular geometries identified within this description.

The skilled person will understand that the invention will work with a wide range of processing techniques to discriminate forward and reverse flows. The processing techniques identified within this patent should be seen as exemplars only and the patent is not restricted to the particular discrimination measures identified in the description.

LIST OF FIGURES

There will now be described, by way of example only, two embodiments of the present invention with reference to and as illustrated in the accompanying drawings of which:

DETAILED DESCRIPTION OF PREFERRED EMBODIMENTS

Figure 2:
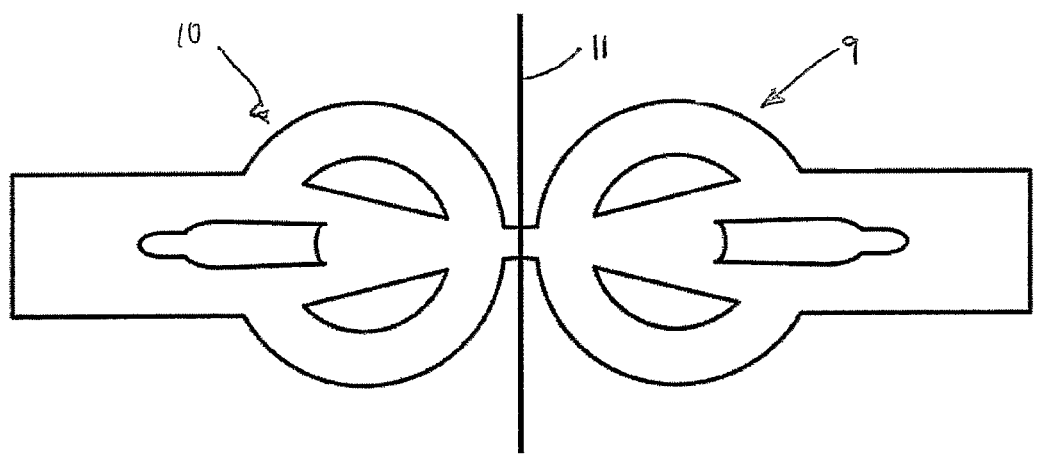
FIG. 2 is a schematic representation of a first embodiment of a bi-directional fluidic oscillator for use in measuring flow of fluid in accordance with at least one aspect of the invention.

FIG. 2 shows a schematic plan view of the flow section of the preferred embodiment of a bi-directional flow meter 100 in accordance with the present invention. The flow meter comprises a single unitary body, for example of plastic material, which contains a set of flow passages that together define two fluidic oscillator devices 9, 100. Each device 9, 10 comprises of a reducer section which creates a jet of fluid feeding into a diffuser section which has first and second diffuser walls and first and second feedback channels respectively associated with the first and second walls which enable some of the jet flow to be fed back to the exit of the reducer section. Each device is also provided with a sensor (not shown) that measures the rate of oscillation and produces a suitable output signal. This aspect is conventional and will be readily understood by a person skilled in the art.

The devices 9, 10 are connected in series such that fluid entering at one end of the body passes through one device before passing through the second and then finally exiting the body. For convenience of description, the leftmost entry to the body when viewing FIG. 2 will be called the inlet and the rightmost the outlet. Fluid can flow either way—from inlet to outlet or vice versa.

The geometry of the flow meter shown in FIG. 2 is symmetric about a plane 11 drawn through the centre of the body. This need not be the case, however, and the devices could differ in design and geometry.

Each oscillator device 9, 10 is therefore identical and will provide the same performance characteristics but they are connected back to back. By this we mean that the inlets of the two oscillators are connected (the ends nearest the reducer section).

Each fluidic oscillator 9, 10 is fitted with sensing means for detecting the oscillation. The sensing means may detect oscillations in either pressure or velocity. Typically it will comprise a inductive, ultrasonic or pressure sensor.

Figure 1:
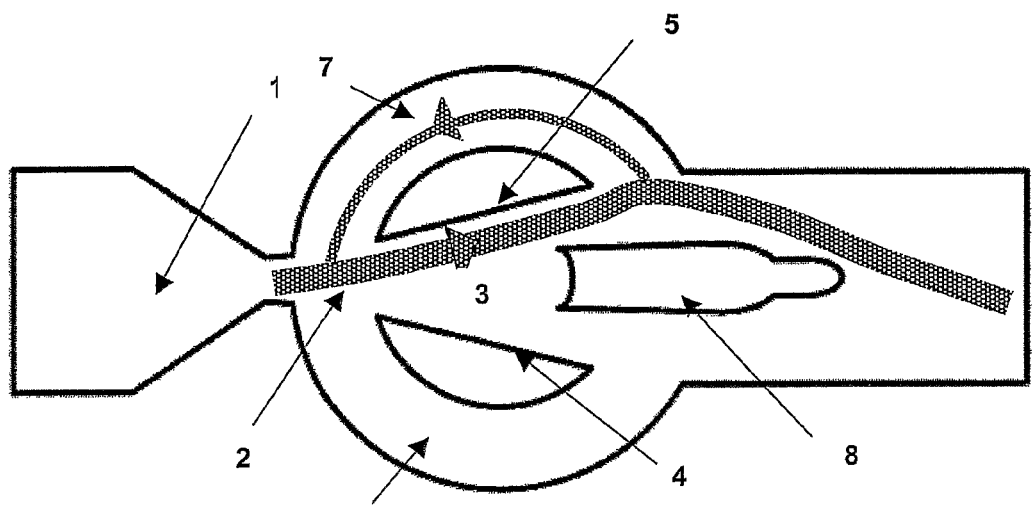
FIG. 1 is a schematic representation of a prior art fluidic oscillator for use in measuring a flow of fluid.

The normal or forward flow mode of operation of the complete bi-directional flow meter is when the flow is from left to right i.e. first through fluidic oscillator 10 and then through fluidic oscillator 9. When the flow is in this direction from left to right the geometry of the flow meter is such that the fluidic oscillator 9 is configured in its forward or normal mode of operation (as described with reference to the prior art device of FIG. 1) whilst fluidic oscillator 10 is configured in its reverse mode. Fluidic oscillator 9 will oscillate with the normal range of frequencies for such a fluidic oscillator whilst fluidic oscillator 10 will ideally not oscillate or if it oscillates at all will do so with a frequency, amplitude of oscillation or stability of frequency of oscillation which enables any reverse mode oscillation of the fluidic oscillator 10 to be distinguished from the forward mode oscillation frequency of fluidic oscillator 9.

The sensing means within fluidic oscillator 9 will detect the normal range of frequencies whilst the sensing means in fluidic oscillator 10 will detect no oscillation or oscillations with a range of frequencies and/or amplitudes or stability of frequency of oscillation which enables it be determined that fluidic oscillator 9 is operating in forward mode and that the fluidic oscillator 10 is operating in reverse mode. The complete fluidic oscillator will therefore measure a flowrate using fluidic oscillator 9. This will be indicated as a forward flow.

In the reverse flow mode the flow is in the direction form right to left i.e. first through fluidic oscillator 9 and then through fluidic oscillator 10. When the flows is in this direction from right to left the geometry of the complete fluidic oscillator is such that the fluidic oscillator 10 is configured in its forward or normal mode of operation whilst oscillator 9 is configured in its reverse mode. Fluidic oscillator 10 will oscillate with the normal range of frequencies for such a fluidic oscillator whilst fluidic oscillator 9 will ideally not oscillate or if it oscillates at all will do so with a range of frequencies, amplitudes of oscillation or stability of frequency of oscillation which enables any reverse mode oscillation of the fluidic oscillator 9 to be distinguished from the forward mode oscillation frequency of fluidic oscillator 10. The sensing means within fluidic oscillator 10 will detect the normal range of frequencies whilst the sensing means in fluidic oscillator 9 will detect no oscillation or oscillations with a range of frequencies, amplitudes or stability of frequency of oscillation which enables it be determined that fluidic oscillator 10 is operating in forward mode and that the fluidic oscillator 9 is operating in reverse mode. The complete fluidic oscillator will therefore measure a flowrate using fluidic oscillator 10. This will be indicated as a reverse flow.

Since the fluidic oscillator has symmetry about the plane 11 shown in FIG. 2 the characteristics of the fluidic oscillators 10 and 9 will be identical when operated in the forward direction. Therefore the forward and reverse characteristics of the complete fluidic oscillator flowmeter will be identical. The forward and reverse flow measurements will then have an identical performance.

When used in the forward direction fluidic oscillator 10 acts as a flow conditioner to fluidic oscillator 9 and in the reverse direction fluidic oscillator 9 acts as a flow conditioner to fluidic oscillator 10. This has the effect of improving the linearity of the fluidic oscillator characteristic without the need of a separate flow conditioner on the inlet to the complete fluidic oscillator. The low flow performance is also enhanced by the presence of a reversed fluidic oscillator upstream of the fluidic oscillator used in the forward direction.

Because the complete fluidic oscillator when operated in either direction has only one reducer and one diffuser the pressure drop across the fluidic oscillator is comparable to that across a conventional single fluidic oscillator.

Figure 3:
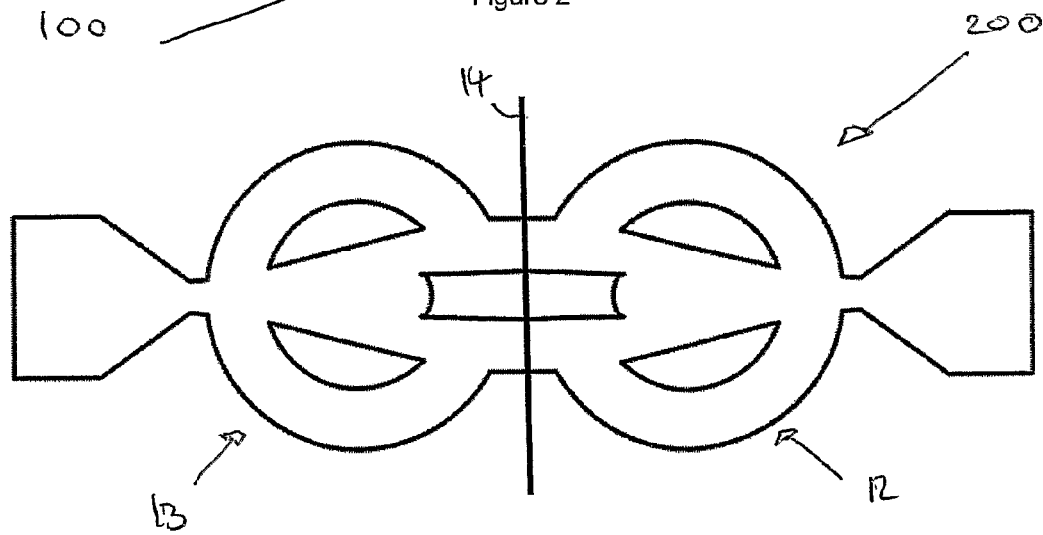
FIG. 3 is a schematic representation of a first embodiment of a bi-directional fluidic oscillator for use in measuring flow of fluid in accordance with at least one aspect of the invention.

An alternative embodiment of the bi-directional fluidic oscillator 200 is shown in FIG. 3. In this embodiment two fluidic oscillators 12 and 13 are configured in such a way that in the normal flow direction, left to right, the fluidic oscillator 13 is operated in its normal mode and the fluidic oscillator 12 is operated in its reverse mode. Under these circumstances the sensing means in oscillator 13 will sense the normal range of frequencies for the fluidic oscillator and the sensing means in fluidic oscillator 12 will ideally sense no oscillation or oscillations whose frequencies, amplitudes, or stability of frequency of oscillation enable it to be determined that fluidic oscillator 13 is operating in its forward mode and the fluidic oscillator 12 is operating in reverse mode. This will identified as forward flow. In the reverse flow direction the flow is from right to left in which the fluidic oscillator 12 is operated in its normal mode and the fluidic oscillator 13 is operated in its reverse mode. Under these circumstances the sensing means in oscillator 12 will sense the normal range of frequencies for the fluidic oscillator and the sensing means in fluidic oscillator 13 will ideally sense no oscillation or oscillations whose frequencies, amplitudes, or stability of frequency of oscillation enable it to be determined that the fluidic oscillator 12 is operating in its forward mode and fluidic oscillator 13 is operating in reverse mode. This will identified as reverse flow.

Other embodiments of the bi-directional fluidic oscillator may be envisaged in which the geometry is not symmetric about the central axis and which the geometry of the two fluidic oscillators differ. Such a configuration would for example enable fluidic oscillator 10 or 13 to have a performance down to lower flowrates than fluidic oscillator 9 or 12. This would enable lower reverse flows to be measured than forward flows and would therefore not require a domestic water flowmeter to have a return valve. Alternatively the geometries may differ to enable better discrimination of the forward and reverse flows.

The invention claimed is:

1. A bi-directional flowmeter comprising a first fluidic oscillator device arranged to measure the flow of fluid in a first direction and a second fluidic oscillator device arranged to measure the flow of fluid in a second direction opposite to the first direction, in which the two oscillators devices are connected together in series between an inlet port and an outlet port of the flowmeter between which the fluid to be measured can flow, and in which the first and second oscillator devices are connected back to back such that the inlet side for one is connected to the inlet side for the other.

2. The bi-directional flowmeter of claim 1 in which the two oscillator devices are provided within a single body.

3. The bi-directional flowmeter of claim 1 in which the two oscillator devices define an asymmetrical structure in which fluidic oscillator devices in forward and reverse directions are capable of being used for metering but with a different overall metering performance for forward and reverse flows.

4. The bi-directional flowmeter of claim 1 in which the oscillator first encountered by the flow of fluid on passing through the flow meters acts as a flow conditioner to the fluid flow prior to its entering the other oscillator.

5. The bi-directional flowmeter of claim 1 in which each oscillator device includes a measurement means adapted to provide an output signal indicative of the rate of oscillation of fluid flowing through the oscillator at least when operating in its "normal" direction, i.e, fluid flowing from its inlet to its outlet.

6. The bi-directional flowmeter of claim 5 in which the measurement means comprises an inductive sensor, an ultrasonic sensor or a pressure sensor.

7. The bi-directional flowmeter according to claim 5 in which each oscillator device provides an output signal which has an amplitude and/or frequency and/or stability of the frequency of oscillation that falls within a different range when operating in its normal direction (flow from inlet to outlet) than in the reverse direction.

8. The bi-directional flowmeter of claim 5 in which each device produces an output signal having a stability of frequency of oscillation representing the flow rate which lies within a first range of frequencies, amplitudes or stability of frequency for the normal operation for non-zero flow rates and which lies within a second range of frequencies, amplitudes or stability of frequency of oscillation for the reverse operation, the two ranges not overlapping such that the signals from both devices can be compared and the flow direction to be unambiguously determined.

9. The bi-directional flowmeter of claim 8 in which the devices are arranged such that there is no oscillation for a device operating in the reverse mode.

10. The bi-directional flowmeter of claim 1 in which the two devices are configured such that any reflection of fluid along the joining axis is such that the pressure drop across the whole device is no greater than that across a single fluidic oscillator.

11. The bi-directional flowmeter of claim 1 in which each fluidic oscillator device comprises a reducer section which creates a jet of fluid feeding into a diffuser section which has first and second diffuser walls and first and second feedback channels respectively associated with the first and second walls which enable some of the jet flow to be fed back to the exit of the reducer section.

12. The bi-directional flowmeter of claim 1 in which the first and second oscillator devices are identical and comprise of a plurality of flow passages that are symmetrically reflected about an axis whereby the performance of the oscillators is the same in both the forward and reverse directions.

* * * * *

UNITED STATES PATENT AND TRADEMARK OFFICE
CERTIFICATE OF CORRECTION

| | | |
|---|---|---|
| PATENT NO. | : 8,136,413 B2 | |
| APPLICATION NO. | : 12/530961 | |
| DATED | : March 20, 2012 | |
| INVENTOR(S) | : Michael Langley Sanderson | |

It is certified that error appears in the above-identified patent and that said Letters Patent is hereby corrected as shown below:

In the Title Page:

Item (57), Abstract, line 5 (International Publication No. WO 2008/110766, Abstract, line 3): "oscillators" should be --oscillator--.

In the Specification:

Column 1, line 5: "bidirectional" should be --bi-directional--.

Column 2, line 13: "oscillators" should be --oscillator--.

Column 2, line 24: "bidirectional" should be --bi-directional--.

Column 2, line 28: After "they", insert --not--.

Column 2, line 46: After "be", insert --the--.

Column 3, line 29: "present i.e." should be --present, i.e.--.

Column 3, line 33: After "may", insert --be--.

Column 3, line 41: After "section", insert --.--.

Column 3, line 43: "bidirectional" should be --bi-directional--.

Column 4, line 13: "devices 9, 100." should be --devices 9, 10.--.

Column 4, line 42: "a inductive" should be --an inductive--.

Signed and Sealed this
Tenth Day of July, 2012

David J. Kappos
*Director of the United States Patent and Trademark Office*

CERTIFICATE OF CORRECTION (continued)
U.S. Pat. No. 8,136,413 B2

Column 4, line 45: "right i.e." should be --right, i.e.--.

Column 4, line 63: After "it" insert --to--.

Column 5, line 1: "form" should be --from--.

Column 5, line 2: "left i.e." should be --left, i.e.--.

Column 5, line 9: "flows" should be --flow--.

Column 5, line 20: After "it" insert --to--.

Column 5, line 58: After "will" insert --be--.

Column 6, line 2: After "will" insert --be--.

In the Claims:

Column 6, line 21, claim 1: "oscillators" should be --oscillator--.

Column 6, line 37, claim 4: "flow meters" should be --flowmeters--.